United States Patent
Jung

(10) Patent No.: US 7,931,015 B2
(45) Date of Patent: Apr. 26, 2011

(54) METHOD AND APPARATUS FOR CONTROLLING DIESEL ENGINE

(75) Inventor: Jae Yoon Jung, Yongin (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 402 days.

(21) Appl. No.: 12/018,592

(22) Filed: Jan. 23, 2008

(65) Prior Publication Data
US 2009/0114199 A1 May 7, 2009

(30) Foreign Application Priority Data
Nov. 7, 2007 (KR) .................. 10-2007-0113221

(51) Int. Cl.
*B60T 7/12* (2006.01)
(52) U.S. Cl. ............... 123/676; 123/406.23; 701/105; 60/274
(58) Field of Classification Search .......... 123/676, 123/678, 703, 478; 701/102
See application file for complete search history.

(56) References Cited

U.S. PATENT DOCUMENTS

| 5,158,063 | A  | * | 10/1992 | Hosoda et al. | 123/676 |
| 7,571,601 | B2 | * | 8/2009 | Lee | 60/286 |
| 2005/0086932 | A1 | * | 4/2005 | Cheong | 60/295 |
| 2005/0252198 | A1 | * | 11/2005 | Okugawa et al. | 60/284 |
| 2006/0005532 | A1 | * | 1/2006 | Kitahara | 60/285 |

FOREIGN PATENT DOCUMENTS

| JP | 09-049448 | 2/1997 |
| JP | 2005-351106 | 12/2005 |
| JP | 2006-161625 | 6/2006 |

* cited by examiner

Primary Examiner — John T Kwon
(74) Attorney, Agent, or Firm — Morgan, Lewis & Bockius LLP

(57) ABSTRACT

A diesel engine may be stably controlled without an exhaust gas temperature at an upstream side of a turbocharger, by a method for controlling a diesel engine that includes: detecting an engine rotation speed; detecting or estimating a lambda value; estimating an exhaust gas temperature at an upstream side of a turbocharger by using relationship between the lambda value and an exhaust temperature; determining whether the estimated exhaust gas temperature exceeds a first predetermined reference value; and limiting an engine output power and/or regeneration of a CPF when the estimated exhaust gas temperature exceeds the first predetermined reference value.

20 Claims, 4 Drawing Sheets

METHOD AND APPARATUS FOR CONTROLLING DIESEL ENGINE

CROSS-REFERENCE TO RELATED APPLICATION

This application claims priority to and the benefit of Korean Patent Application No. 10-2007-0113221, filed in the Korean Intellectual Property Office on Nov. 7, 2007, the entire contents of which are incorporated herein by reference.

BACKGROUND OF THE INVENTION (a) Field of the Invention

The present invention relates to a diesel engine, and more particularly, a method and apparatus for controlling a diesel engine equipped with a turbocharger.

(b) Description of the Related Art

A diesel engine may be provided with a turbocharger in order to increase an output power of the engine, to reduce the emission, or to enhance fuel consumption.

When the turbocharger is overheated, oil used for lubrication and cooling of the turbocharger may catch a fire.

The diesel engine shows merits on fuel consumption and output torque, but it shows drawbacks in exhaust gas. That is, although the diesel engine produces less carbon monoxide CO and hydrocarbon HC, it produces more nitrogen oxide (typically, called NOx) and particulate matters because of its high temperature of the combustion chamber caused by its high compression ratio.

Typically, particulate matters can be reduced by combustion control. However, an emission control scheme for reducing NOx may result in an increase of particulate matters, and an emission control scheme for reducing particulate matters may result in an increase of NOx. Therefore, it is very difficult to reduce both the NOx and particulate matters at the same time.

Usually, a diesel engine is provided with a diesel catalyzed particulate filter (CPF) for reducing the particulate matters.

The CPF collects the particulate matters exhausted by the engine, and when more than a predetermined amount of the particulate matters are collected, the CPF is regenerated by burning the particulate matters collected in the CPF in increasing the exhaust gas by employing a post-injection.

On the other hand, a diesel engine is typically provided with an exhaust gas temperature sensor that senses an exhaust gas temperature at an upstream side of a turbocharger. Such a detection of the exhaust gas temperature is useful for preventing an overheating of the turbocharger, for limiting the exhaust gas temperature, and for preventing an overheating of the CPF.

In addition, a lambda sensor is typically provided at a downstream side of the turbocharger in order to measure an air/fuel ratio for the purpose of controlling EGR and adjusting fuel injection.

Thus, an engine control unit (ECU) controls the fuel injection and post-injection, based on the data obtained by the exhaust gas temperature sensor and the lambda sensor located at the upstream and downstream sides of the turbocharger respectively.

However, the exhaust gas temperature sensor located at the upstream side of the turbocharger may have a very short lift time and may be easily become malfunctioned because it is always exposed to very hot exhaust gas and it may easily gather particulate matters. In the case of malfunctioning of the exhaust gas temperature sensor, the exhaust gas temperature may not be controlled such that the turbocharger may be overheated to catch a fire, and the regeneration of the CPF may not be appropriately controlled.

Furthermore, such an employment of the exhaust gas temperature sensor at the upstream side of the turbocharger increases the total work process and thus decreases productivity for manufacturing a vehicle.

Recently, some researches are made in order not to employ the exhaust gas temperature sensor but instead, to employ a method to estimate the exhaust gas temperature.

As an example, Japanese Patent Laid-Open Publication No. 2005-351106 discloses that the exhaust gas temperature can be measured by a heater resistance of an air/fuel ratio sensor.

In addition, Japanese Patent Laid-Open Publication No. 2006-161625 discloses that the exhaust gas temperature can be estimated based on an impedance of the lambda sensor and the heating amount of the heater installed therein.

In addition, Japanese Patent Laid-Open Publication No. 1997-049448 discloses that the exhaust gas temperature can be estimated based on an intake air amount and a target air/fuel ratio.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for controlling a diesel engine having advantages of stably controlling the diesel engine including stably controlling regeneration of a CPF without an exhaust gas temperature sensor at an upstream side of a turbocharger.

An exemplary embodiment of the present invention provides a method for controlling a diesel engine that includes: detecting an engine rotation speed; detecting a lambda value; estimating an exhaust gas temperature at an upstream side of a turbocharger by using relationship between the lambda value of the detected engine rotation speed and the exhaust gas temperature; determining whether the estimated exhaust gas temperature exceeds a first predetermined reference value; and limiting an engine output power and regeneration of a CPF when the estimated exhaust gas temperature exceeds the first predetermined reference value.

The method may further include: determining whether the estimated exhaust gas temperature is below a second predetermined reference value; and releasing the limitation of the engine output power and/or the stoppage of the CPF regeneration when the estimated exhaust gas temperature is below the second predetermined reference value.

The first predetermined reference value may be greater than the second predetermined reference value.

The first predetermined reference value may be about 800° C., and the second predetermined reference value may be about 750° C.

Another exemplary embodiment of the present invention provides a method for controlling a diesel engine that includes: detecting an engine rotation speed; estimating a lambda value; estimating an exhaust gas temperature at an upstream side of a turbocharger by using relationship between the estimated lambda value of the detected engine rotation speed and the exhaust gas temperature at the detected engine rotation speed; determining whether the estimated exhaust gas temperature exceeds a first predetermined reference value; and limiting an engine output power and/or regeneration of a CPF when the estimated exhaust gas temperature exceeds the first predetermined reference value.

The method may further include: determining whether the estimated exhaust gas temperature is below a second predetermined reference value; and releasing the limitation of the engine output power and the stoppage of the CPF regeneration when the estimated exhaust gas temperature is below the second predetermined reference value.

In the estimating of the lambda value, an intake air amount into a combustion chamber of the engine may be detected and the lambda value may be estimated based on the detected intake air amount and the detected engine rotation speed.

The first predetermined reference value may be greater than the second predetermined reference value.

The first predetermined reference value may be about 800° C., and the second predetermined reference value may be about 750° C.

An exemplary embodiment of the present invention provides an apparatus for controlling a diesel engine that includes: an engine speed sensor that detects an engine rotation speed; a lambda sensor that detects an air/fuel ratio at a downstream side of a turbocharger; an air flow sensor that detects an intake air amount drawn into a combustion chamber; an injector that injects fuel into the combustion chamber; and an engine control unit that controls the injector based on signals from the engine speed sensor, the lambda sensor, and the air flow sensor, wherein the engine control unit executes a program comprising instructions for the above described method for controlling a diesel engine according to an exemplary embodiment.

According to an exemplary embodiment, a fuel injection, an air amount, and an exhaust gas temperature may be stably controlled without an exhaust temperature sensor at an upstream side of a turbocharger of a diesel engine.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DESCRIPTION OF REFERENCE NUMERALS INDICATING PRIMARY ELEMENTS IN THE DRAWINGS

Figure 1:
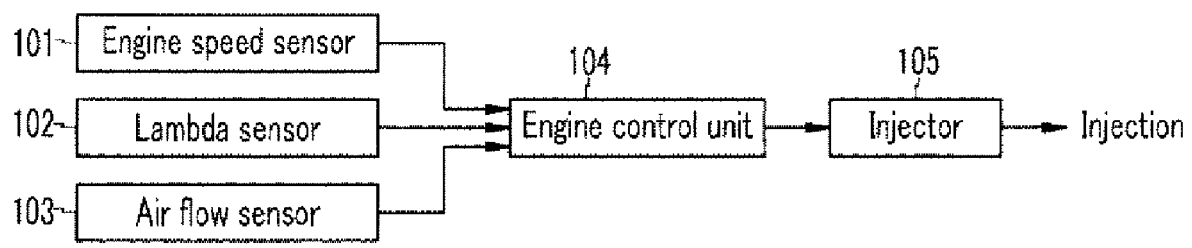
FIG. 1 shows a schematic block diagram of an apparatus for controlling a diesel engine according to an exemplary embodiment of the present invention.

| 101: engine speed sensor | 102: lambda sensor |
| 103: air flow sensor | 104: engine control unit (ECU) |
| 105: injector | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

FIG. 1 shows a block diagram of an apparatus for controlling a diesel engine according to an exemplary embodiment of the present invention.

As shown in FIG. 1, an apparatus for controlling a diesel engine according to an exemplary embodiment of the present invention includes an engine speed sensor 101, a lambda sensor 102, an air flow sensor 103, an engine control unit (ECU) 104, and an injector 105.

The engine speed sensor 101 detects a rotation speed of the engine, and it may be realized as a crank position sensor (CPS) that detects an angular position of a crankshaft, or a cam angle sensor (CAS) that detects an angular position of a camshaft. The ECU 104 receives signal from the engine speed sensor 101 and calculate the engine rotation speed from the signal.

The lambda sensor 102 is arranged at a downstream side of a turbocharger, and detects an oxygen concentration (i.e., air/fuel ratio) of the exhaust gas. The lambda sensor 102 provides a signal (hereinafter called a lambda value) for the detected air/fuel ratio to the ECU 104.

The air flow sensor 103 detects an air amount drawn to a combustion chamber of the engine, and provides a signal for the detected air amount to the ECU 104.

The ECU 104 estimates an exhaust gas temperature at the upstream side of the turbocharger by using a relationship between the lambda value and the engine rotation speed. The relationship between the lambda value and the exhaust gas temperature is experimentally obtained and is preset in the ECU 104 as a map table for each engine rotation speed. The ECU 104 controls fuel injection amount, air amount drawn into the combustion chamber, and regeneration of the CPF, based on the estimated exhaust gas temperature.

In addition, the ECU 104 determines whether the lambda sensor 102 is malfunctioning. In the case of the lambda sensor 102 malfunctioning, the ECU 104 estimates the lambda value based on an engine rotation speed and an intake air amount into a combustion chamber of the engine, and then the ECU 104 uses the engine rotation speed and the estimated lambda value instead of actually measuring the lambda value received from the lambda sensor to estimate an exhaust gas temperature at the upstream of the turbo charger.

The injector 105 injects the fuel into the combustion chamber according to a control signal from the ECU 104.

Hereinafter, a method for controlling a diesel engine according to an exemplary embodiment of the present invention is described in detail with reference to the drawings.

Process for the Correctly-Functioning of the Lambda Sensor

Figure 2:
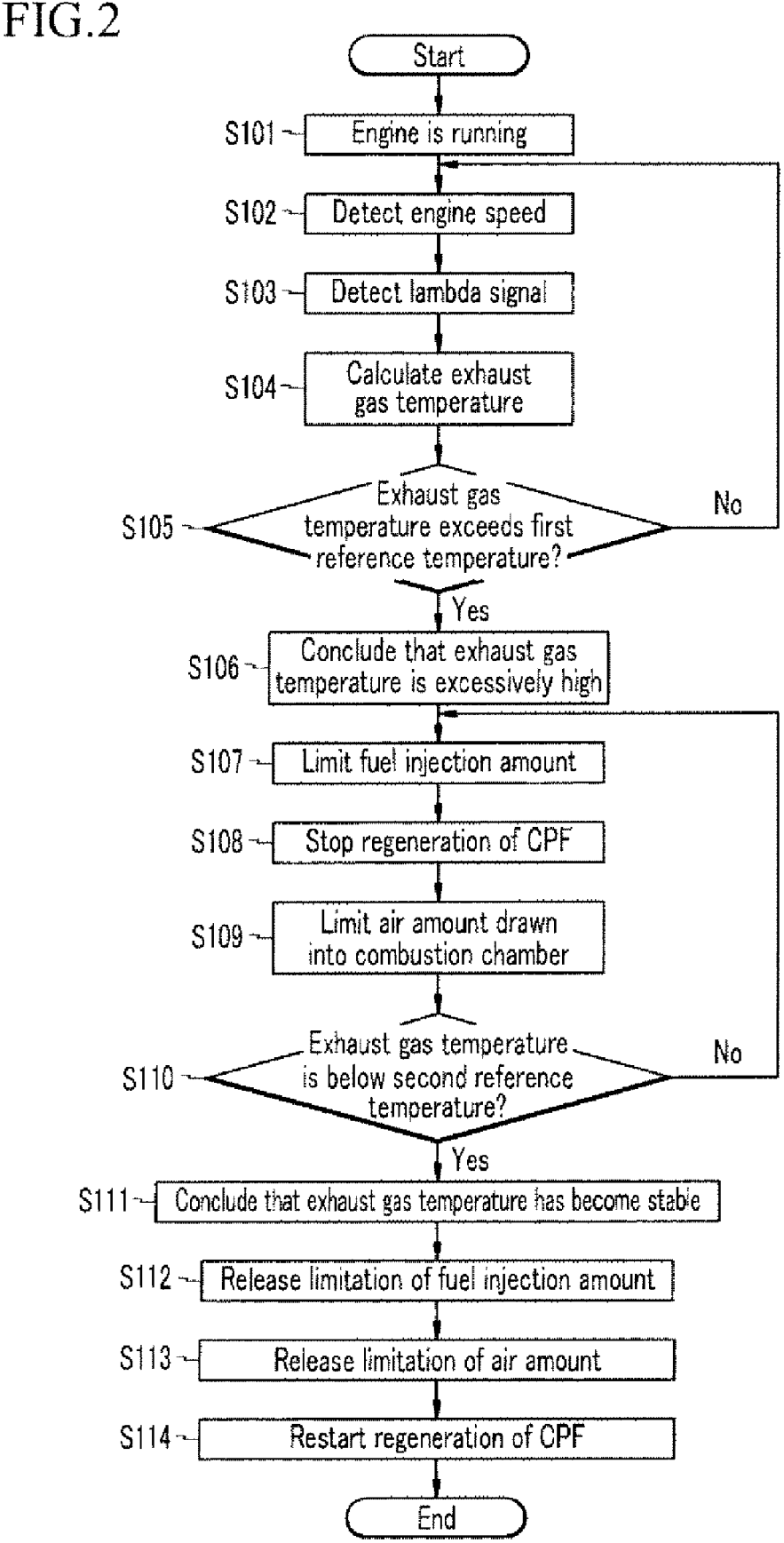
FIG. 2 shows a flowchart for a method for controlling a diesel engine in the case of lambda sensor correctly-functioning according to an exemplary embodiment of the present invention.

Firstly, a method for controlling a diesel engine in the case of lambda sensor correctly-functioning according to an exemplary embodiment of the present invention is described in detail with reference to FIG. 2.

While the diesel engine is running at step S101, the ECU 104 detects a current engine rotation speed by the engine speed sensor 101 at step S102, and detects an air/fuel ratio at the downstream side of the turbocharger by the lambda sensor 102 at step S103.

Subsequently at step S104, the ECU 104 estimates the exhaust gas temperature at the upstream side of the turbocharger based on the engine rotation speed detected by the engine speed sensor 101 and the air/fuel ratio detected by the lambda sensor 102.

Typically, heat relation between upstream and downstream side of the turbocharger is written as the following Equations 1 and 2.

$$\Delta Q = Cw \times \Delta m_{air\ amount} \times T3 \quad \text{(Equation 1)}$$

$$\Delta Q = Q_{LHV} \times \Delta m_{fuel\ amount} \quad \text{(Equation 2)}$$

In the above Equation 1 and Equation 2, Cw denotes a specific heat [joule/gram/° K.] of the fluid, $\Delta m_{air\ amount}$ denotes an air amount [gram] drawn into the combustion chamber, $\Delta T3$ denotes a temperature difference between the upstream and downstream sides of the turbocharger, and $Q_{LHV}$ denotes a minimum heating value.

The following Equation 3 is obtained from the above Equation 1 and 2.

$$\Delta T3 = [Q_{LHV} \times \Delta m_{fuel\ amount}]/[Cw \times \Delta m_{air\ amount}] = (Q_{LHV}/Cw) \times (1/\lambda) \quad \text{(Equation 3)}$$

Here, λ denotes the air/fuel ratio.

As can be understood from the Equation 3, the temperature difference between the upstream and downstream sides of the turbocharger is proportional to an inverse value of the air/fuel ratio, i.e., the lambda value.

Figure 4:
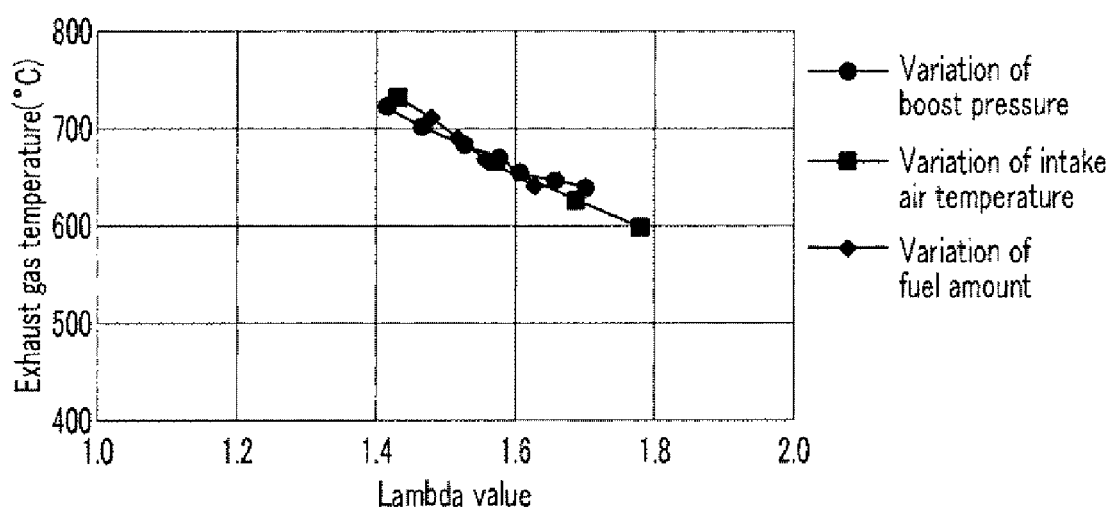
FIG. 4 shows a relationship between lambda sensor values and exhaust temperature values of a diesel engine.

FIG. 4 is a graph that shows a relationship between the exhaust gas temperature difference and the lambda value (λ), at an engine rotation speed of 4,000 rpm with 1.5 liter diesel engine.

As can be understood from the graph of FIG. 4, the lambda value (λ) and the temperature difference between the upstream and downstream sides of the turbocharger is inversely proportional, with variations of the boost pressure, the intake air temperature, and injection amount, although the relationship may vary depending on the engine rotation speed. Such an inversely proportional relationship is experimentally obtained and is preset as a map table in the ECU 104.

Therefore, the ECU 104 may estimate the exhaust gas temperature at the upstream side of the turbocharger based on the current engine rotation speed and the lambda value (λ) from the lambda sensor 102, by using the preset map table depending on engine rotation speeds.

When the exhaust gas temperature at the upstream side of the turbocharger is estimated at the step S104, the ECU 104 determines at step S105 whether the estimated exhaust gas temperature exceeds a first predetermined reference temperature, e.g., 800° C.

When the estimated exhaust gas temperature at the upstream side of the turbocharger exceeds the first reference temperature, the ECU 104 concludes that the exhaust gas temperature is excessively high at step S106.

Then, the ECU 104 limits the fuel injection amount of the injector 105 at step S107 such that an output power of the engine may be limited and the load of the turbocharger may be reduced.

At the same time, the ECU 104 stops the regeneration of the CPF by the post-injection at step S108, and the ECU 104 limits an air amount drawn into the combustion chamber by activating an air flow control valve (not shown) at step S109.

After that, the ECU 104 determines at step S110 whether the estimated exhaust gas temperature at the upstream side of the turbocharger is below a second predetermined reference temperature, for example, 750° C.

When the exhaust gas temperature at the upstream side of the turbocharger is not below the second predetermined reference temperature, the process returns to the step S107 such that the steps of S107, S108, and S109 may be executed until the exhaust gas temperature becomes below the second predetermined reference temperature.

When the exhaust gas temperature at the upstream side of the turbocharger is below the second reference temperature, the ECU 104 concludes at step S111 that the exhaust gas temperature has become stable.

Therefore, the ECU 104 releases the limitation of the fuel injection amount at step S112 and also releases the limitation of the air amount at step S113. Then, the ECU 104 restarts the regeneration of the CPF by restarting the post-injection at step S114.

Process for the Malfunctioning of the Lambda Sensor

Figure 3:
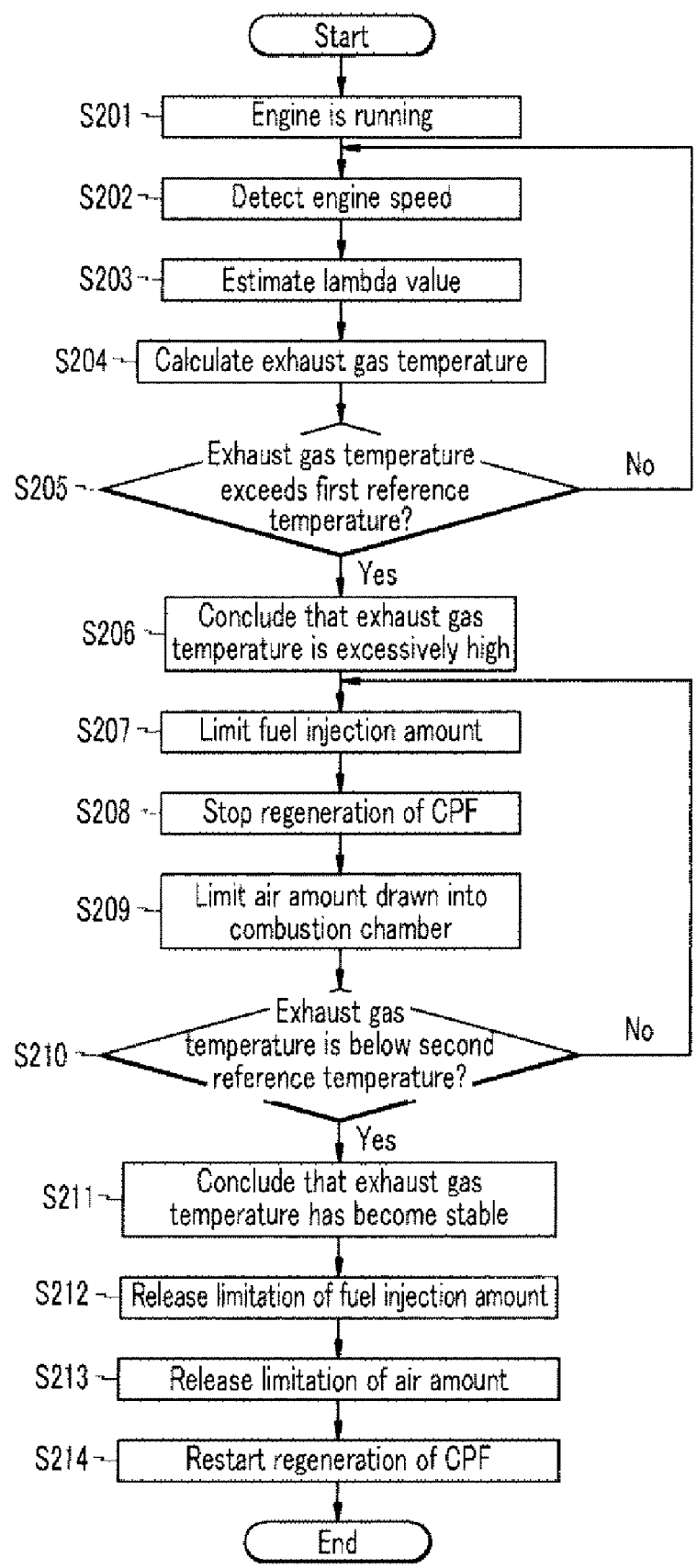
FIG. 3 shows a flowchart for a method for controlling a diesel engine in the case of lambda sensor malfunctioning according to an exemplary embodiment of the present invention.

In the above description, the method is described in connection with the case that the lambda sensor is correctly functioning. Hereinafter, the method is described in detail in connection with the case that the lambda sensor 102 is malfunctioning, with reference to FIG. 3.

The malfunctioning of the lambda sensor 102 may be determined by a conventional way known to a person of ordinary skill in the art. For example, the lambda sensor 102 may be understood to be malfunctioning if no signal is obtained from the lambda sensor 102, or a signal beyond a predetermined range is obtained from the lambda sensor 102.

When the malfunctioning of the lambda sensor 102 is detected, the ECU 104 enters a limp-home mode, and executes the following process. The following process corresponds to the process described above with reference to FIG. 2. The process for the malfunctioning of the lambda sensor 102 differs from the case of correctly-functioning lambda sensor in that, the lambda value (λ, equivalently, the air/fuel ratio) is estimated based on an intake air amount to the combustion chamber of the engine and the engine rotation speed, whereas the lambda value (λ) is directly detected by the lambda sensor 102 at the step S103.

While the diesel engine is running at step S201, the ECU 104 detects a current engine rotation speed by the engine speed sensor 101 at step S202. Then at step S203, the ECU 104 detects an intake air amount drawn into the combustion chamber by the air flow sensor 103, and estimates the lambda value (λ) based on the intake air amount and the engine rotation speed by which the ECU 104 is currently driving the injector 105.

Subsequently at step S204, the ECU 104 estimates the exhaust gas temperature at the upstream side of the turbocharger based on the engine rotation speed detected by the engine speed sensor 101 and the estimated lambda value (λ), i.e., estimated air/fuel ratio.

Then, at step S205, the ECU 104 determines whether the estimated exhaust gas temperature exceeds the first predetermined reference temperature, e.g., 800° C.

When the estimated exhaust gas temperature at the upstream side of the turbocharger exceeds the first predetermined reference temperature, the ECU 104 concludes that the exhaust gas temperature is excessively high at step S206.

Then, the ECU 104 limits the fuel injection amount of the injector 105 at step S207 such that an output power of the engine may be limited and the load of the turbocharger may be reduced.

At the same time, the ECU 104 stops the regeneration of the CPF by the post-injection at step S208, and the ECU 104 limits an intake air amount drawn into the combustion chamber by activating an air flow control valve (not shown) at step S209.

After that, the ECU 104 determines at step S210 whether the estimated exhaust gas temperature at the upstream side of the turbocharger is below the second predetermined reference temperature, for example, 750° C.

When the exhaust gas temperature at the upstream side of the turbocharger is not below the second predetermined reference temperature, the process returns to the step S207 such that the steps of S207, S208, and S209 may be executed until the exhaust gas temperature becomes below the second predetermined reference temperature.

When the exhaust gas temperature at the upstream side of the turbocharger is below the second predetermined reference temperature, the ECU 104 concludes at step S211 that the exhaust gas temperature has become stable.

Therefore, the ECU 104 releases the limitation of the fuel injection amount at step S112 and also releases the limitation of the air amount at step S213. Then, the ECU 104 restarts the regeneration of the CPF by restarting the post-injection at step S214.

The ECU 104 can be realized by one or more processors activated by predetermined program, and the predetermined program can be programmed to perform each step of a method according to an embodiment of this invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling a diesel engine, comprising:
   detecting an engine rotation speed;
   detecting a lambda value including an air/fuel ratio by a lamda sensor that detects the lamda value at a downstream side of a turbocharger;
   estimating an exhaust gas temperature at an upstream side of the turbocharger by using relationship between the lambda value of the detected engine rotation speed and the exhaust gas temperature;
   determining whether the estimated exhaust gas temperature exceeds a first predetermined reference value; and
   limiting an engine output power and stopping regeneration of a catalyzed particulate filter (CPF) by post-injection when the estimated exhaust gas temperature exceeds the first predetermined reference value.

2. The method of claim 1, further comprising:
   determining whether the estimated exhaust gas temperature is below a second predetermined reference value; and
   releasing the limitation of the engine output power and the stoppage of the CPF regeneration when the estimated exhaust gas temperature is below the second predetermined reference value.

3. The method of claim 2, wherein the first predetermined reference value is greater than the second predetermined reference value.

4. The method of claim 3, wherein the first predetermined reference value is about 800° C., and the second predetermined reference value is about 750° C.

5. The apparatus of claim 2, wherein temperature difference (ΔT3) between the upstream and downstream sides of the turbocharger is determined by:

$$\Delta T3 = [Q_{LHV} \times \Delta m_{fuel\ amount}]/[Cw \times \Delta m_{air\ amount}] = (Q_{LHV}/Cw) \times (1/\lambda)$$

wherein, λ denotes the air/fuel ratio, Cw denotes a specific heat of a fluid, $\Delta m_{air\ amount}$ denotes an air amount drawn into a combustion chamber, $\Delta m_{fuel\ amount}$ denotes fuel amount drawn into the combustion chamber, ΔT3 denotes a temperature difference between the upstream and downstream sides of the turbocharger, and $Q_{LHD}$ denotes a minimum heating value.

6. A method for controlling a diesel engine, comprising:
   detecting an engine rotation speed;
   detecting an intake air amount into a combustion chamber of the engine;
   estimating a lambda value including an air/fuel ratio at a downstream side of a turbocharger, the estimation being based on the detected intake air amount and the engine rotation speed;
   estimating an exhaust gas temperature at an upstream side of the turbocharger by using relationship between the estimated lambda value of the detected engine rotation speed and the exhaust gas temperature;
   determining whether the estimated exhaust gas temperature exceeds a first predetermined reference value; and
   limiting an engine output power and stopping regeneration of a CPF by post-injection, when the estimated exhaust gas temperature exceeds the first predetermined reference value.

7. The method of claim 6, further comprising:
   determining whether the estimated exhaust gas temperature is below a second predetermined reference value; and
   releasing the limitation of the engine output power and the stoppage of the CPF regeneration when the estimated exhaust gas temperature is below the second predetermined reference value.

8. The method of claim 7, wherein the first predetermined reference value is greater than the second predetermined reference value.

9. The method of claim 8, wherein the first predetermined reference value is about 800° C., and the second predetermined reference value is about 750° C.

10. The apparatus of claim 7, wherein temperature difference (ΔT3) between the upstream and downstream sides of the turbocharger is determined by:

$$\Delta T3 = [Q_{LHV} \times \Delta m_{fuel\ amount}]/[Cw \times \Delta m_{air\ amount}] = (Q_{LHV}/Cw) \times (1/\lambda)$$

wherein, λ denotes the air/fuel ratio, Cw denotes a specific heat of a fluid, $\Delta m_{air\ amount}$ denotes an air amount drawn into the combustion chamber, $\Delta m_{fuel\ amount}$ denotes fuel amount drawn into the combustion chamber, and $Q_{LHV}$ denotes a minimum heating value.

11. An apparatus for controlling a diesel engine, comprising:
   an engine speed sensor that detects an engine rotation speed;
   a lambda sensor that detects a lambda value including an air/fuel ratio at a downstream side of a turbocharger;
   an air flow sensor that detects an intake air amount drawn into a combustion chamber;
   an injector that injects fuel into the combustion chamber; and
   an engine control unit that controls the injector based on signals from the engine speed sensor, the lambda sensor, and the air flow sensor,
   wherein the engine control unit executes a program comprising instructions for:
      detecting the engine rotation speed;
      detecting the lambda value by the lamda sensor;
      estimating an exhaust gas temperature at an upstream side of the turbocharger by using relationship between the lambda value of the engine rotation speed and the exhaust temperature;
      determining whether the estimated exhaust gas temperature exceeds a first predetermined reference value; and
      limiting an engine output power and stopping regeneration of a CPF by post-injection when the estimated exhaust gas temperature exceeds the first predetermined reference value.

12. The apparatus of claim 11, wherein the program further comprises instructions for:
   determining whether the estimated exhaust gas temperature is below a second predetermined reference value; and
   releasing the limitation of the engine output power and the stoppage of the CPF regeneration when the estimated exhaust gas temperature is below the second predetermined reference value.

13. The apparatus of claim 12, wherein the first predetermined reference value is greater than the second predetermined reference value.

14. The apparatus of claim 13, wherein the first predetermined reference value is about 800° C., and the second predetermined reference value is about 750° C.

15. The apparatus of claim 12, wherein temperature difference (ΔT3) between the upstream and downstream sides of the turbocharger is determined by:

$$\Delta T3 = [Q_{LHV} \times \Delta m_{fuel\ amount}]/[Cw \times \Delta m_{air\ amount}] = (Q_{LHV}/Cw) \times (1/\lambda)$$

wherein, λ denotes the air/fuel ratio, Cw denotes a specific heat of a fluid, $\Delta m_{air\ amount}$ denotes an air amount drawn into the combustion chamber, $\Delta m_{fuel\ amount}$ denotes fuel amount drawn into the combustion chamber, and $Q_{LHV}$ denotes a minimum heating value.

16. An apparatus for controlling a diesel engine, comprising:
   an engine speed sensor that detects an engine rotation speed;
   a lambda sensor that detects an air/fuel ratio at a downstream side of a turbocharger;
   an air flow sensor that detects an intake air amount drawn into a combustion chamber;
   an injector that injects fuel into the combustion chamber; and
   an engine control unit that controls the injector based on signals from the engine speed sensor, the lambda sensor, and the air flow sensor,
   wherein the engine control unit executes a program comprising instructions for:
      detecting the engine rotation speed;
      detecting the intake air amount into the combustion chamber of the engine;
      estimating a lambda value including the air/fuel ratio at a downstream side of the turbocharger, the estimation being based on the detected intake air amount and the engine rotation speed;
      estimating an exhaust gas temperature at an upstream side of the turbocharger by using relationship between the estimated lambda value of the detected engine rotation speed and the exhaust gas temperature;
      determining whether the estimated exhaust gas temperature exceeds a first predetermined reference value; and
      limiting an engine output power and stopping regeneration of a CPF by post-injection, when the estimated exhaust gas temperature exceeds the first predetermined reference value.

17. The apparatus of claim 16, wherein the program further comprises instructions for:
   determining whether the estimated exhaust gas temperature is below a second predetermined reference value; and
   releasing the limitation of the engine output power and the stoppage of the CPF regeneration when the estimated exhaust gas temperature is below the second predetermined reference value.

18. The apparatus of claim 17, wherein the first predetermined reference value is greater than the second predetermined reference value.

19. The apparatus of claim 18, wherein the first predetermined reference value is about 800° C., and the second predetermined reference value is about 750° C.

20. The apparatus of claim 17, wherein temperature difference (ΔT3) between the upstream and downstream sides of the turbocharger is determined by:

$$\Delta T3 = [Q_{LHV} \times \Delta m_{fuel\ amount}]/[Cw \times \Delta m_{air\ amount}] = (Q_{LHV}/Cw) \times (1/\lambda)$$

wherein, λ denotes the air/fuel ratio, Cw denotes a specific heat of a fluid, $\Delta m_{air\ amount}$ denotes an air amount drawn into the combustion chamber, $\Delta m_{fuel\ amount}$ denotes fuel amount drawn into the combustion chamber, and $Q_{LHV}$ denotes a minimum heating value.

* * * * *